United States Patent
Liu

(12) United States Patent (10) Patent No.: US 7,607,132 B2
Liu (45) Date of Patent: Oct. 20, 2009

(54) PROCESS SCHEDULING SYSTEM AND METHOD

(75) Inventor: Yi-Cheng Liu, Dajia Township, Taichung County (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 953 days.

(21) Appl. No.: 10/820,410

(22) Filed: Apr. 8, 2004

(65) Prior Publication Data

US 2005/0240926 A1  Oct. 27, 2005

(51) Int. Cl.
G06F 9/48 (2006.01)
(52) U.S. Cl. .................................... 718/102
(58) Field of Classification Search ............. 718/1, 718/100, 102, 105, 107
See application file for complete search history.

(56) References Cited

U.S. PATENT DOCUMENTS

| | | | | |
|---|---|---|---|---|
| 5,418,953 A * | 5/1995 | Hunt et al. | ................. | 718/102 |
| 5,442,730 A * | 8/1995 | Bigus | ........................ | 706/19 |
| 5,812,844 A * | 9/1998 | Jones et al. | ................. | 718/104 |
| 5,870,604 A * | 2/1999 | Yamagishi | ................. | 718/105 |
| 5,889,944 A * | 3/1999 | Butt et al. | ................... | 709/203 |
| 5,999,963 A | 12/1999 | Bruno et al. | | |
| 6,023,720 A * | 2/2000 | Aref et al. | .................... | 718/103 |
| 6,327,622 B1 * | 12/2001 | Jindal et al. | ................. | 709/228 |
| 6,785,889 B1 * | 8/2004 | Williams | .................... | 718/104 |
| 2002/0078121 A1 * | 6/2002 | Ballantyne | .................. | 709/102 |
| 2004/0187120 A1 * | 9/2004 | Moore et al. | ................ | 718/100 |

* cited by examiner

Primary Examiner—James Trujillo
Assistant Examiner—William Spieler
(74) Attorney, Agent, or Firm—Thomas, Kayden, Horstemeyer & Risley

(57) ABSTRACT

A process scheduling system and method. The system includes a fetch module, a timing scheduling module and a trigger module. The fetch module fetches resource status data of at least one resource item of an application system periodically. The timing scheduling module dynamically determines an execution time point for at least one process according to the resource status data. The trigger module executes the process at the execution time point. The fetch module further fetches the resource status data as feedback for further determination after the process is executed.

12 Claims, 6 Drawing Sheets

PROCESS SCHEDULING SYSTEM AND METHOD

BACKGROUND

The present invention relates to a scheduling system and method, and particularly to a process scheduling system and method that dynamically schedules processes according to resource status.

In some application systems, such as production line systems, several applications (processes) may be executed on the equipment control server simultaneously. Application performance plays an important role in mission-critical semiconductor production since unexpected slowdown can affect productivity. Additionally, load balancing is also important to keep the system operating efficiently.

Currently, processes are handled equally via a fixed predefined execution schedule in the application system. However, each process may be of different practical importance for the application system. For example, processes controlling product fabrication are more important than those performing standard tasks, such as file backup and logging, which can be rolled back and executed when the application system is not busy. However, since there is no mechanism for process scheduling, the system can become overloaded, causing suspension or crashes, resulting in service loss.

SUMMARY

The present invention is proposed to solve the aforementioned issues.

Accordingly, it is an object of the present invention to provide a process scheduling system and method that dynamically schedules processes according to resource status.

To achieve the above object, the present invention provides a process scheduling system. The system includes a fetch module, a timing scheduling module and a trigger module. The fetch module periodically fetches resource status data, such as central processing unit (CPU) use rate or disk use rate of application system resources. The timing scheduling module dynamically determines an execution time point for at least one process according to the resource status data. The trigger module directs execution at the prescribed execution time point. The fetch module further fetches resource status data as feedback for further determination after the process is executed.

According to the present invention, a process scheduling method is also provided. First, resource status data of at least one resource item of an application system is fetched. Then, an execution time point for at least one process is determined according to the resource status data, and the process is directed to execute at the execution time point. Thereafter, the resource status data is further fetched as feedback for further determination after the process is executed.

The above-mentioned method may take the form of program code embodied in a tangible media. When the program code is loaded into and executed by a machine, the machine becomes an apparatus for practicing the invention.

BRIEF DESCRIPTION OF THE DRAWINGS

The aforementioned objects, features and advantages of this invention will become apparent by referring to the following detailed description of the preferred embodiment with reference to the accompanying drawings, wherein.

DESCRIPTION

The present invention provides a system and method overcoming conventional process scheduling problems.

Figure 1:
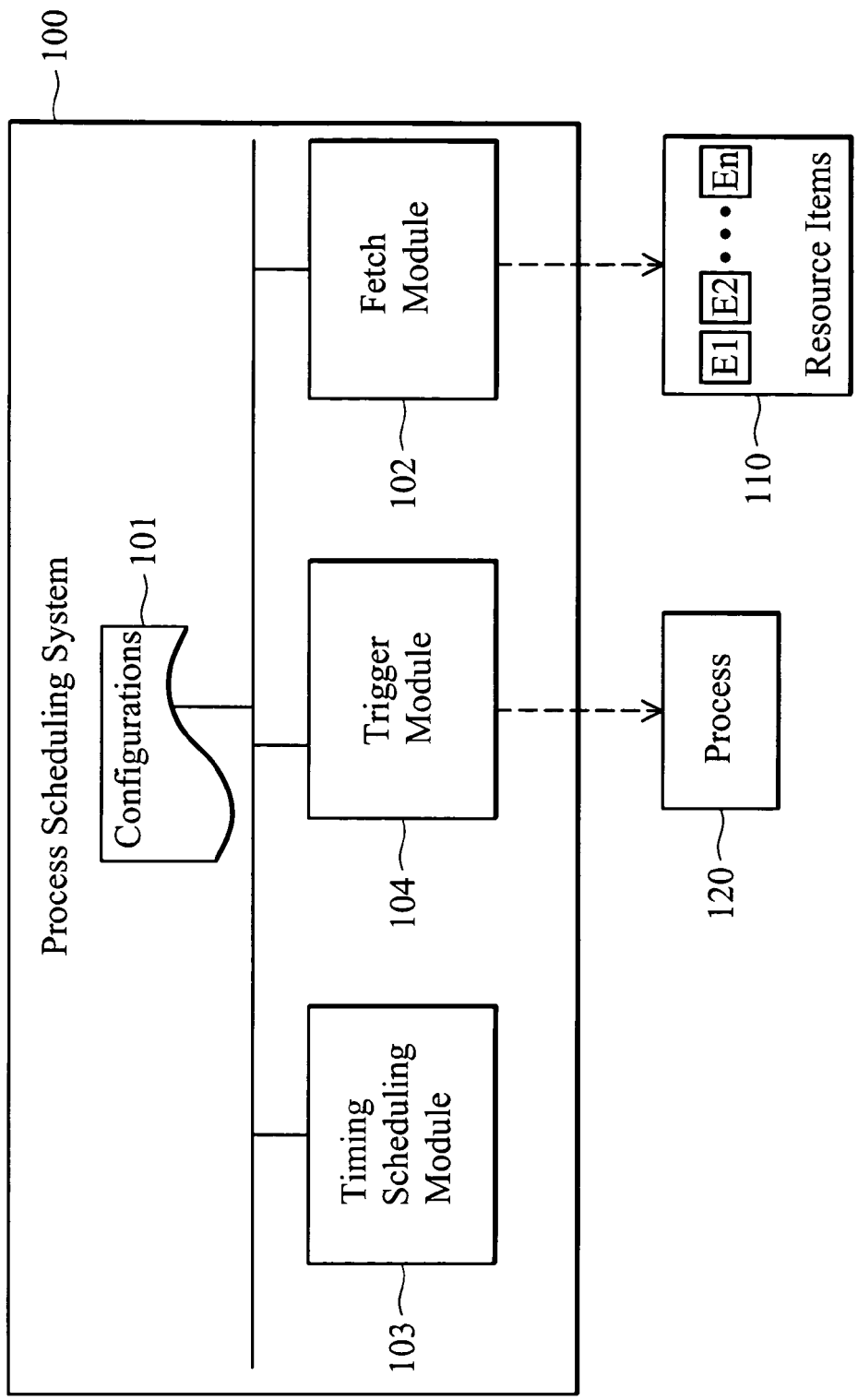
FIG. 1 is a schematic diagram of the architecture of the process scheduling system according to the present invention.

FIG. 1 illustrates the architecture of the process scheduling system 100 according to the present invention.

The system 100 includes a plurality of configurations 101, a fetch module 102, a timing scheduling module 103 and a trigger module 104. The configurations 101 record resource items 110 including E1~En to be monitored, at least one process 120 to be scheduled, a fetch frequency and a reference range. The resource items 100 may comprise a plurality of items E1~En, such as central processing unit (CPU) and disk of an application system (not shown), but are not limited thereto. The process 120 comprises an application of less importance to the application system. The fetch frequency and the reference range can be used by the fetch module 102 and the timing scheduling module 103 respectively, as discussed later.

Additionally, the configurations 101 further comprises an original time setting for the process 120, allowing execution thereof in the application system according to the original time setting before the process scheduling of the present invention. It is understood that the process scheduling system 100 provides an interface via which users can set the configurations 101.

The fetch module 102 periodically fetches resource status data, such as CPU use rate or disk use rate of the application system. The timing scheduling module 103 dynamically determines an execution time point for the process 120 according to the resource status data fetched by the fetch module 102 within the reference range, and transmits the execution time point to the trigger module 104. The trigger module 104 directs the process 120 to execute at the execution time point. The determination method of the execution time point is discussed later.

Figure 2:
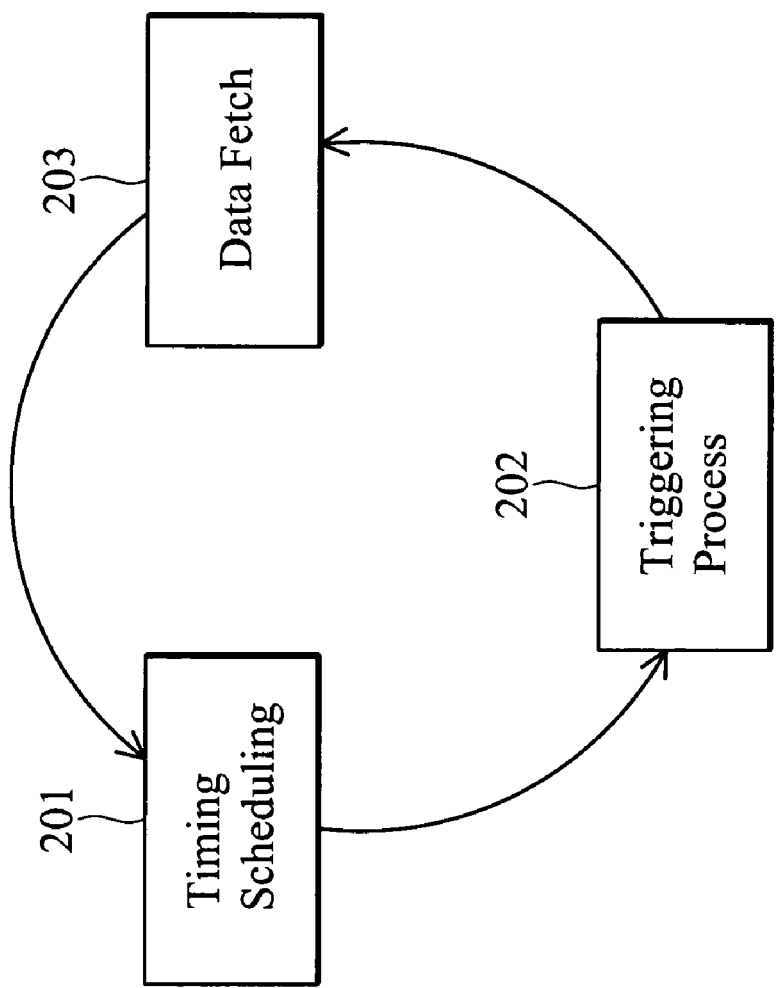
FIG. 2 is a schematic diagram illustrating the operating cycle of the invention.

FIG. 2 illustrates the operating cycle of the invention, in which operations including timing scheduling 201, triggering 202 and data fetch 203 are repeated as a feedback cycle. Accordingly, the fetch module 102 further fetches resource status data for use as feedback for further determination after the execution time point is determined and the process is executed.

Figure 3:
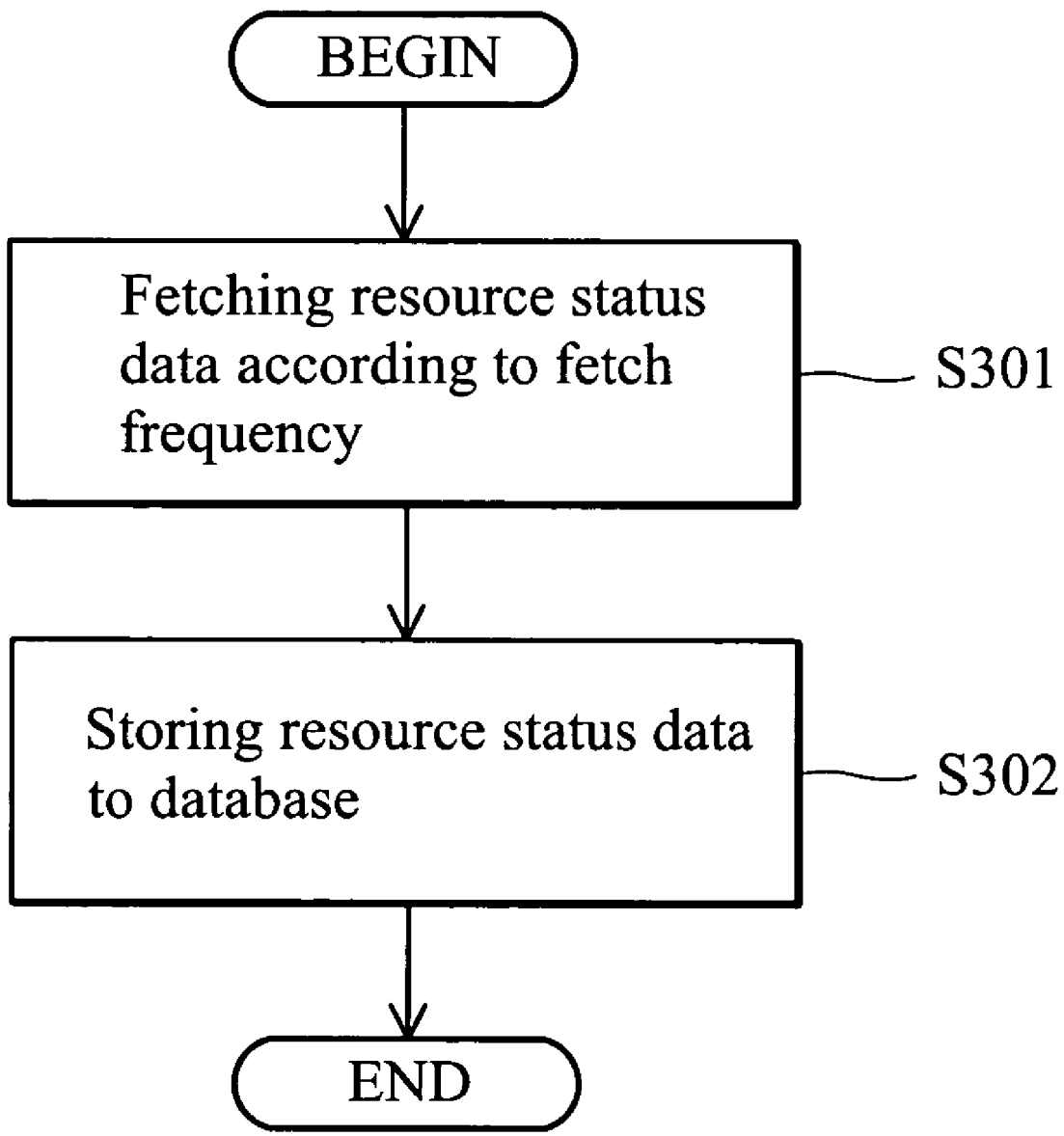
FIG. 3 is a flowchart showing the operation of a fetch module of the process scheduling system according to the present invention.

FIG. 3 shows the operation of the fetch module 102 of the process scheduling system 100 according to the present invention. First, in step S301, the fetch module 102 fetches the resource status data of the resource items 110 according to the fetch frequency. Then, in step S302, the fetch module 102 stores the fetched data to a database (not shown in FIG. 1). It is noted that the fetch module 102 continues to monitor the resource items 110, fetching resource status data irrespective of whether the determination of execution time point is performed. Further, the fetch module 102 may use a cleaning mechanism to delete resource status data if it is not accessed for a predefined period.

Figure 4:
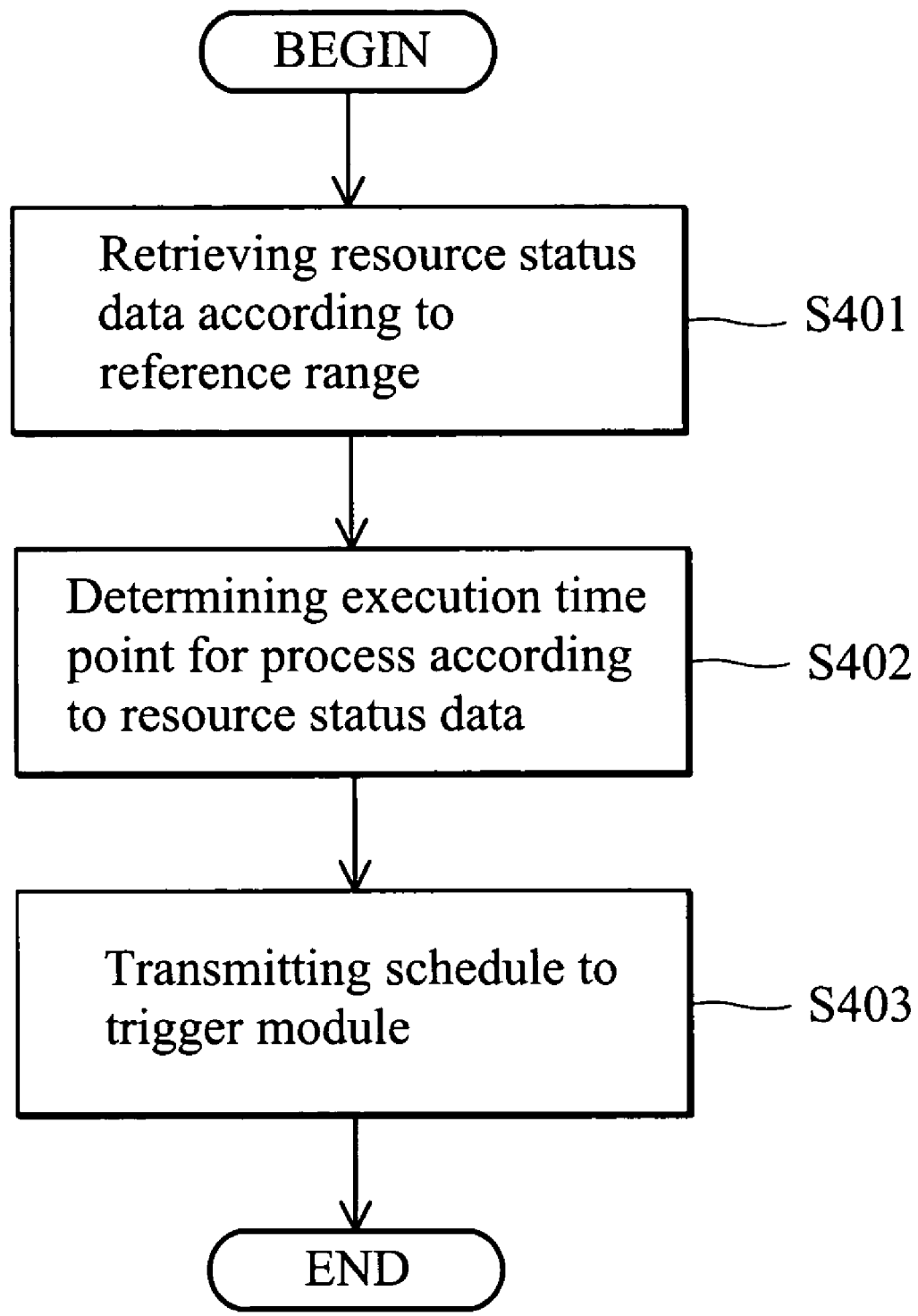
FIG. 4 is a flowchart showing the operation of a timing scheduling module of the process scheduling system according to the present invention.

FIG. 4 shows the operation of the timing scheduling module 103 of the process scheduling system 100 according to the present invention. First, in step S401, the timing scheduling module 103 retrieves resource status data according to the reference range from the fetch module 102. In step S402, the timing scheduling module 103 determines the execution time point for the process 120 according to the resource status data. The timing scheduling module 103 determines the execution time point based on a neural network model, specifically the Q'tron NN (Neural Network) model.

The number of output levels of each Q'tron can be greater than two. Specifically, if $\mu_i$ represents the $i^{th}$ Q'tron in a Q'tron NN, the output of $\mu_i$, denoted as $Q_i$ takes up its value in a finite integer set $\{0,1,\ldots,q_i-1\}$ with $q_i(\geq 2)$ as the number of the output level. Additionally, $Q_i$ is also weighted by a specific positive value $a_i$, referred to as active weight, representing the unit excitation strength of that Q'tron. The term $a_i Q_i$ thus refers to the active value of $\mu_i$, which represents the total excitation strength of that Q'tron. In a Q'tron NN, for a pair of connected Q'trons $\mu_i$ and $\mu_j$, there is only one connection strength, i.e. $T_{ij}=T_{ji}$.

In Q'tron NN model, each Q'tron in the NN is allowed to be noise-injected.

$$\hat{H} = H_i + N_i = \sum_{j=1}^{n} T_{ij}(a_j Q_j) + I_i + N_i \quad (1)$$

where $H_i$ denotes the noise-free net stimulus of $\mu_i$, equal to the sum of internal stimuli, namely, $$\sum_{j=1}^{n} T_{ij}(a_j Q_j),$$

and external stimulus $I_i$. The term $N_i$ denotes the additive noise fed into $\mu_i$, and n denotes the number of Q'trons in the NN. A Q'tron NN is considered to be in simple mode if it is noise-free, i.e., $N_i=0$ for all i; otherwise, it is considered to be in full mode. At each time step only one Q'tron is selected for level transition, subject to the following rule:

$$Q_i(t+1) = Q_i(t) + \Delta Q_i(t), \text{ with} \quad (2)$$

$$\Delta Q_i(t) = \begin{cases} +1 & \text{whenever } \hat{H}_i(t) \rangle \frac{1}{2}|T_{ii}a_i| \text{ and } Q_i(t)\langle q_i - 1; \\ -1 & \text{whenever } \hat{H}_i(t)\langle -\frac{1}{2}|T_{ii}a_i| \text{ and } Q_i(t)\rangle 0; \\ 0 & \text{otherwise;} \end{cases} \quad (3)$$

wherein it is assumed that the $i^{th}$ Q'tron is selected at time t+1. From the model description for a Q'tron NN, if each Q'tron, $\mu_i$ has $q_i=2$, $a_i=1$ and $T_{ii}=0$, and the NN runs in simple mode, the Q'tron NN model is reduced to the original Hopfield model.

The system energy $\epsilon$ embedded in a Q'tron NN, called Liapunov energy, is defined by the following formula:

$$\varepsilon = -\frac{1}{2} \sum_{i=1}^{n} \sum_{j=1}^{n} (a_i Q_i) T_{ij}(a_j Q_j) - \sum_{i=1}^{n} I_i(a_i Q_i) + K \quad (4)$$

where n is total number of Q'tron in the NN, and K can be any suitable constant. It is shown that, in simple mode, the energy $\epsilon$ defined monotonically decreases with time. Therefore, if a problem can be mapped into one which minimizes the function $\epsilon$ given in the above form, the corresponding NN autonomously solves the problem after $\epsilon$ reaches a global/local minimum. However, an enormous number of local minimums may, in fact, represent unsatisfactory solutions. In the Q'tron NN approach, $N_i$ serves to control the solution quality to a problem. In brief, if the desirable solution quality is given, the allowable range of noise strength injected into each Q'tron can be systematically determined. By persistently injecting such strength-bound noises into Q'trons, the NN eventually settles on a state corresponding to a satisfactory solution.

Using Q'tron NN to determine the schedule and timing of processes and avoid system peak time is important for server system resource optimization. CPU use rate, disk use rate and peak time interval are adopted as processing elements, and fetched data within reference range is fed into the model. Minimum energy value $\epsilon$, and several of which are used in timing scheduling in full mode. It is assumed that $Q_k^{cpu\_act} \in \{0,1,\ldots,100\}$ and $Q_k^{disk\_act} \in \{0,1,\ldots,100\}$ present CPU use rate and disk use rate respectively. The constants $K_1^{tar} \in \{0,1,\ldots,100\}$ and $K_2^{tar} \in \{0,1,\ldots,100\}$ indicate the targeted CPU use rate and disk use rate. When the energy is astringent and stable, the local minimum is obtained in simple mode. Thus, energy functions $\epsilon_1$ and $\epsilon_2$ for CPU use rate and disk use rate are as follows:

$$\varepsilon_1 = \frac{1}{2} \sum_{i=m}^{n} \left\{ \sum_{k=i-m}^{i+m} a^{cpu\_act} Q_k^{cpu\_act} - \sum_{k=i-m}^{i+m} K_1^{tar} \right\}^2 \text{ and,} \quad (5)$$

$$\varepsilon_2 = \frac{1}{2} \sum_{i=p}^{q} \left\{ \sum_{k=i-p}^{i+p} a^{disk\_act} Q_k^{disk\_act} - \sum_{k=i-p}^{i+p} K_2^{tar} \right\}^2, \quad (6)$$

and total energy function $\epsilon$ is as follows:

$$\epsilon = \lambda_1 \epsilon_1 + \lambda_2 \epsilon_2 + N_i \quad (7).$$

Using simple mode to achieve local minimum is faster but may be insufficient, whereby noise can be further injected into Q'tron NNs and more targets can be founded and recorded as process execution time points. Referring to FIG. 4 again, in step S403, the timing scheduling module 103 transmits the schedule of the process with the execution time point to the trigger module 104.

Figure 5:
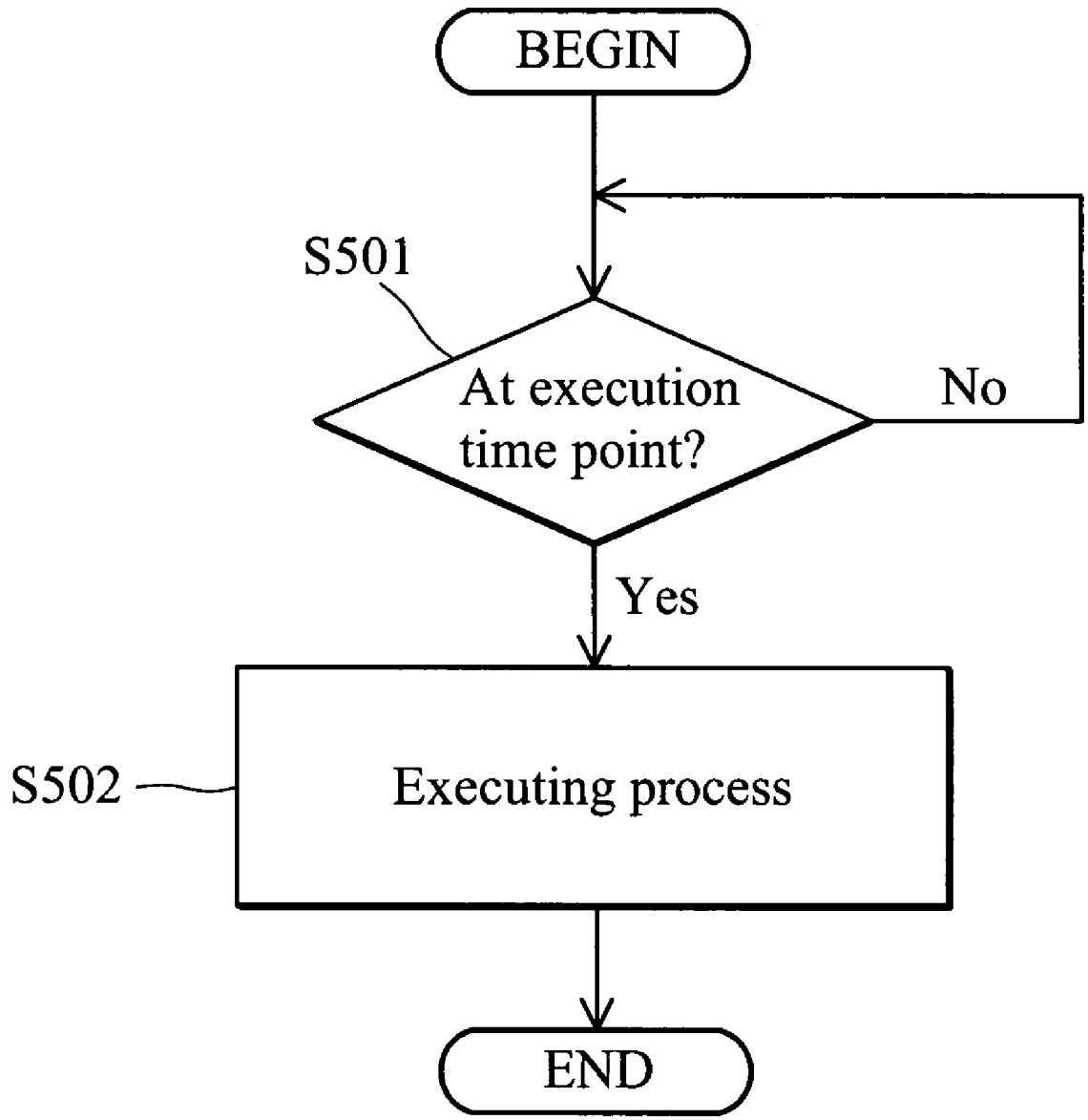
FIG. 5 is a flowchart showing the operation of a trigger module of the process scheduling system according to the present invention.

FIG. 5 shows the operation of the trigger module 104 of the process scheduling system 100 according to the present invention. First, in step S501, it is determined whether the time is at the execution time point. If not (No in step S501), the flow remains at step S501. Otherwise (Yes in step S501), in step S502, the trigger module 104 directs the process 120 to execute.

Figure 6:
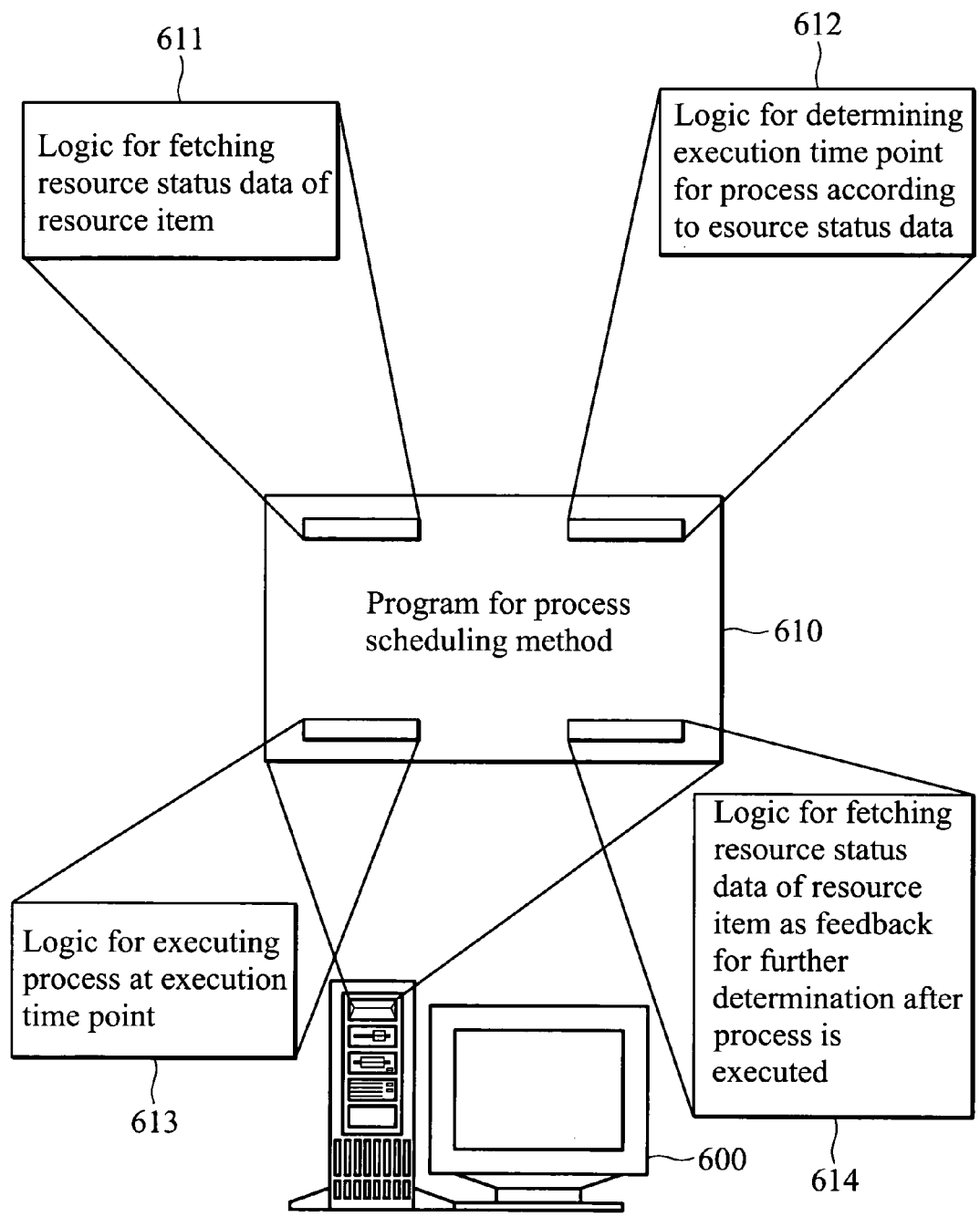
FIG. 6 is a schematic diagram of a storage medium storing a computer program providing the process scheduling method.

FIG. 6 is a schematic diagram of a storage medium for a computer program providing the process scheduling method according to the present invention. The computer program product comprises a storage medium 610 having computer readable program code embodied in the medium for use in a computer system 600, the computer readable program code comprising at least computer readable program code 611 fetching resource status data of at least one resource item of an application system, computer readable program code 612 determining an execution time point for at least one process according to the resource status data, computer readable program code 613 directing the process to execute at the execution time point, and computer readable program code 614 fetching the resource status data of the resource item as feedback for further determination after the process is executed.

The present invention thus provides a process scheduling system and method that dynamically and flexibly schedules processes according to resource status, thereby balancing system load, and reducing productivity and service loss.

The method and system of the present invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The method and systems of the present invention may also be embodied in the form of program code transmitted over transmission media, such as electrical wiring or cabling, through fiber optics, or other forms of transmission wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those skilled in this technology can still make various alterations and modifications without departing from the scope and spirit of this invention. Therefore, the scope of the present invention shall be defined and protected by the following claims and their equivalents.

What is claimed is:

1. A process scheduling system to schedule processes on an application system, comprising:
    a plurality of configurations comprising at least one resource item and at least one process of the application system, wherein at least one resource item comprises a central processing unit (CPU) or a disk of the application system;
    a fetch module to fetch resource status data of the resource item;
    a timing scheduling module to use a neural network model to determine an execution time point for the process according to the resource status data, and the resource status data is fed to the neural network model for calculating the execution time point for the process; and
    a trigger module to determine whether the execution time point for the process is present, and execute the process at the execution time point when the execution time point for the process is present.

2. The system of claim 1 wherein the configuration further comprises a fetch frequency, and according to which the fetch module fetches the resource status data.

3. The system of claim 1 wherein the resource status data for determination is within a predetermined reference range, wherein the predetermined reference range is a time interval, and the resource status data is fetched within the time interval.

4. The system of claim 1 wherein the fetch module further fetches the resource status data of the resource item as feedback for further determination after the process is executed.

5. A process scheduling method to schedule processes on an application system, comprising the steps of:
    fetching resource status data of at least one resource item of the application system, wherein at least one resource item comprises a central processing unit (CPU) or a disk of the application system;
    determining an execution time point for at least one process according to the resource status data using a neural network model, and the resource status data is fed to the neural network model for calculating the execution time point for the process;
    determining whether the execution time point for the process is present; and
    when the execution time point for the process is present, executing the process at the execution time point.

6. The method of claim 5 further comprising fetching the resource status data according to a fetch frequency.

7. The method of claim 5 further comprising determining the execution time point according to the resource status data within a predetermined reference range, wherein the predetermined reference range is a time interval, and the resource status data is fetched within the time interval.

8. The method of claim 5 further comprising fetching the resource status data of the resource item as feedback for further determination after the process is executed.

9. A machine-readable storage medium storing a computer program which, when executed, directs a computer to perform a process scheduling method to schedule processes on an application system, comprising the steps of:
    fetching resource status data of at least one resource item of the application system, wherein at least one resource item comprises a central processing unit (CPU) or a disk of the application system;
    determining an execution time point for at least one process according to the resource status data using a neural network model, and the resource status data is fed to the neural network model for calculating the execution time point for the process;
    determining whether the execution time point for the process is present; and
    when the execution time point for the process is present, executing the process at the execution time point.

10. The storage medium of claim 9, storing said computer program which, when executed, further directs the computer to perform the step of fetching the resource status data according to a fetch frequency.

11. The storage medium of claim 9, storing said computer program which, when executed, further directs the computer to perform the step of determining the execution time point according to the resource status data within a predetermined reference range, wherein the predetermined reference range is a time interval, and the resource status data is fetched within the time interval.

12. The storage medium of claim 9, storing said computer program which, when executed, further directs the computer to perform the step of fetching the resource status data of the resource item as feedback for further determination after the process is executed.

* * * * *